United States Patent [19]

Lamela et al.

[11] Patent Number: 5,791,447
[45] Date of Patent: Aug. 11, 1998

[54] TOLERANCE AND WEAR COMPENSATING FRICTION CLUTCH

[75] Inventors: Anthony J. Lamela, Gilberts, Ill.; Thomas F. Christensen, Twin Lakes, Wis.

[73] Assignee: Case Corporation, Racine, Wis.

[21] Appl. No.: 700,984

[22] Filed: Aug. 21, 1996

[51] Int. Cl.⁶ .................. F16D 25/0638; F16D 13/72; F16D 13/75
[52] U.S. Cl. .................. 192/70.25; 152/85 AA; 152/111 A; 152/113.35
[58] Field of Search .................. 192/70.25, 111 A, 192/85 AA, 113.35; 188/71.8, 196 P

[56] References Cited

U.S. PATENT DOCUMENTS

| | | |
|---|---|---|
| 2,251,366 | 8/1941 | Miller et al. |
| 2,965,207 | 12/1960 | Snyder .................. 192/85 AA X |
| 3,054,491 | 9/1962 | Bloch et al. |
| 3,243,026 | 3/1966 | Snoy et al. .................. 192/111 A X |
| 3,353,641 | 11/1967 | Chana |
| 3,814,226 | 6/1974 | White |
| 3,815,716 | 6/1974 | Harrington |
| 3,819,020 | 6/1974 | Smith |
| 3,857,468 | 12/1974 | Iritono et al. |
| 4,134,483 | 1/1979 | Horsch .................. 192/113.35 |
| 4,265,346 | 5/1981 | Emmadi |
| 4,334,597 | 6/1982 | Tovagliaro |
| 4,371,066 | 2/1983 | Fujioka et al. |
| 4,540,067 | 9/1985 | Meynier |
| 4,623,055 | 11/1986 | Ohkubo |
| 4,713,984 | 12/1987 | Ohkubo |
| 4,730,713 | 3/1988 | Pickard et al. |
| 4,934,502 | 6/1990 | Horsch |
| 5,186,284 | 2/1993 | Lamela et al. |
| 5,234,090 | 8/1993 | Haks |
| 5,261,517 | 11/1993 | Hering |
| 5,275,268 | 1/1994 | Masuda |
| 5,325,949 | 7/1994 | Dommett et al. |
| 5,421,439 | 6/1995 | Hayasaki |

*Primary Examiner*—Richard M. Lorence
*Attorney, Agent, or Firm*—Foley & Lardner

[57] ABSTRACT

A clutch structure is provided that automatically compensates for manufacturing or part-to-part tolerance variations in new clutches and that continuously compensates for wear of interleaved clutch plates throughout the life of the clutch. The clutch includes an actuator, preferably a fluid piston, that compresses the clutch plates to engage the clutch and transmit power between two rotating elements. An adjustment ring, fitted to an actuating ring, is contacted by a portion of the piston and is displaced against the force of a biasing spring during engagement of the clutch. Abutment members limit movement of the actuating ring, permitting the piston to displace the adjustment ring unidirectionally on the actuating ring during full engagement of the clutch. Upon disengagement of the clutch, the biasing spring urges the actuating ring, and with it the adjustment ring, back to its disengaged position. The adjustment ring thereby urges the piston to a reference disengaged position. The reference position may be displaced in the direction of the clutch plates as the clutch plates wear, thus providing consistent and uniform engagement and clutch performance over the life of the clutch. The actuating ring preferably covers a fluid passage when the clutch is disengaged, and uncovers the passage by its displacement when the clutch is engaged. Cooling or lubricating fluid is thus admitted into the clutch only upon engagement and fluid flow through the passage is reduced or interrupted upon disengagement.

24 Claims, 4 Drawing Sheets

TOLERANCE AND WEAR COMPENSATING FRICTION CLUTCH

BACKGROUND OF THE INVENTION

The present invention relates generally to a fluid actuated friction clutch of the type having clutch plates engageable by fluid pressure. More particularly, the invention relates to a friction clutch including a structure affording consistent and uniform actuation despite product tolerance variations when new, and wear, particularly of the clutch plates, over time.

Fluid actuated friction clutches are known for selectively coupling and uncoupling rotating shafts to one another, such as in vehicle transmissions and the like. Such clutches typically include an annular piston surrounding one of the shafts and captured in the clutch housing. A series of clutch plates, alternately coupled to the first shaft, such as through the clutch housing, and to the second shaft. Hydraulic fluid is channeled through the first shaft and is selectively pressurized to move the piston against the clutch plates, thereby engaging the plates and causing the second shaft to rotate with the first. A biasing spring forces the piston into retracted position upon depressurization of the fluid to disengage the plates and remove torque from the second shaft. Fluid is also circulated through the clutch housing to remove heat generated by frictional engagement of the plates. A fluid actuated friction clutch generally of this type is described in U.S. Pat. No. 4,905,812, issued on Mar. 6, 1990 to Shepperd and assigned to J.I. Case Company.

In clutches of this type, part-to-part tolerances and gradual wear of clutch plates commonly result in variations in the point at which the clutch plates engage. Various approaches have been developed to reduce or compensate for such variations and thereby provide uniform and consistent clutch engagement between similar clutches and in individual clutches over their useful life. One such approach involves calibrating clutch engagement via an electronic control system, such as by monitoring clutch engagement to identify the point at which the clutch begins to carry torque. A drawback of such solutions is that, while the calibration technique may be effective for compensating for variations between clutches when new, they typically do not adequately compensate for engagement delay that develops over time due to clutch wear. In another approach, various structures have been proposed to compensate for clutch wear by moving a mechanical linkage associated with the clutch actuating piston. Examples of the latter approach are described in U.S. Pat. Nos. 2,965,207; 3,815,716; 5,234,090; and 5,325,949.

While mechanical compensation arrangements of the type mentioned above generally alleviate the need for electronic calibration and may provide some degree of tolerance and wear compensation, they are not without drawbacks. For example, known mechanical compensation arrangements are generally quite complex structures comprising numerous separate elements requiring time consuming assembly. In addition, certain known wear compensation arrangements interpose compensating elements at a point of sealing between the clutch actuator piston and the clutch housing. There is a need, therefore, for an improved tolerance and wear compensating arrangement for a fluid actuated friction clutch that offers effective compensation over the life of the clutch in a straightforward, easily assembled package.

SUMMARY OF THE INVENTION

The invention relates to a novel clutch compensation structure designed to respond to this need, offering uniform and consistent clutch engagement. The arrangement permits initial compensation for manufacturing tolerances upon installation of the clutch, and subsequent compensation for clutch plate wear over the life of the clutch. The compensation arrangement also advantageously permits control of a fluid valve for admitting a fluid flow into the clutch for lubricating and cooling the clutch. By virtue of the continued adjustment for wear, the performance of the valve remains constant over the life of the clutch.

Thus, in accordance with a first aspect of the invention, a selfadjusting fluid clutch is provided for selectively coupling two power transmission elements. The clutch includes a plurality of clutch plates, a piston and a biasing assembly. The clutch plates include first plates coupled to rotate with a first transmission element and second plates coupled to rotate with a second transmission element. The piston is movable between engaged and disengaged positions to selectively apply an engagement force to the clutch plates to engage the clutch. The biasing assembly is disposed to urge the piston toward the disengaged position, and includes an adjustment member contacting the piston to establish the disengaged position thereof. The adjustment member is movable in response to movement of the piston to the engaged position.

In accordance with another aspect of the invention, a self-adjusting clutch is provided for selectively coupling a rotating driving member to a rotatable driven member. The clutch includes a housing, a plurality of clutch plates, an actuator and a self adjustment assembly. The clutch plates are located within the housing and include first clutch plates secured to rotate with the driving member and second clutch plates secured to rotate with the driven member upon engagement with the first clutch plates. The actuator is movable within the housing for selectively urging the first and second clutch plates into mutual engagement. The self adjustment assembly contacts the actuator and defines a disengaged position of the actuator. The adjustment assembly preferably includes an abutment member, a reference member and a biasing assembly. The abutment member is moved by the actuator against the biasing assembly and contacts a portion of the biasing assembly to define an engaged position of the clutch. The reference member is unidirectionally movable during engagement of the clutch to establish the disengaged position of the actuator.

The invention also provides a novel method for compensating for tolerance or wear in a fluid clutch. The method is particularly well suited for use on clutched of the type including a housing, a plurality of clutch plates within the housing and a piston sealingly movable within the housing for selectively urging the clutch plates into engagement and thereby coupling a driving member to a driven member. The method includes the steps of moving an engagement member through a predetermined distance a first direction against a biasing assembly during engagement of the clutch, and moving a reference member through the predetermined distance in the first direction during movement of the engagement member. The reference member is further moved through a compensation distance in the first direction. The engagement member and the reference member are then moved through the predetermined distance in a second direction opposite to the first direction under the influence of the biasing assembly during disengagement of the clutch. The reference member contacting the piston to urge the piston to a reference disengaged position.

In accordance with a further aspect of the invention, a method is provided for actuating a clutch of the type including a housing, a plurality of clutch plates mutually engageable to couple a driving member to a driven member, and an actuator selectively movable between an engagement position and a disengagement position to engage the clutch plates. In accordance with the method, a reference member is moved upon movement of the actuator to the engaged position to establish a reference position for the actuator. A fluid passage is opened by movement of the actuator to the engaged position, thereby admitting a fluid flow into contact with the clutch plates. The actuator is then urged to a disengaged position defined by the reference position upon disengagement of the clutch, while the fluid flow through the fluid passage is reduced by movement of the actuator to the disengaged position.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
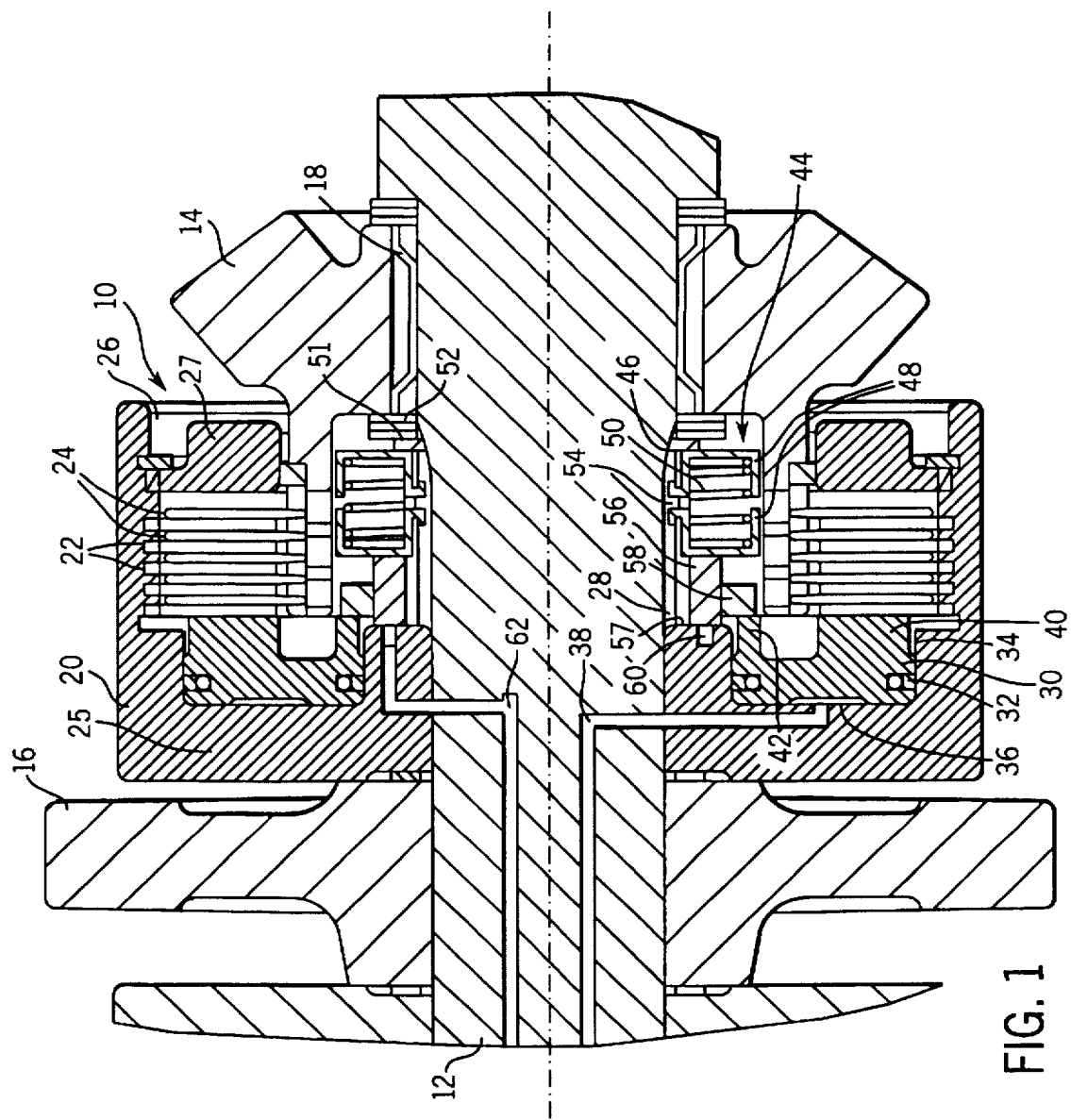
FIG. 1 is a cross sectional view through a clutch including a tolerance and wear compensating arrangement in conjunction with a fluid valve structure, shown in a disengaged position prior to significant wear of the clutch plates.

Turning now to the drawings and referring to FIG. 1, a fluid clutch 10 is illustrated in cross section as installed for selectively coupling an input shaft 12 to an output gear 14. Clutch 10 may thus be engaged, as described below, to transmit power from rotating input shaft 12, which itself may support additional gearing 16 or drive elements, to output gear 14. In the application illustrated, shaft 12 fully traversed clutch 10 and gear 14 is mounted on a suitable bearing 18 to freely rotate on shaft 12 when clutch 10 is disengaged. However, it should be understood that the arrangement of clutch 10 described in detail below may be adapted for other power transmission input and output structures.

Clutch 10 includes a housing 20, a plurality of input clutch plates 22 secured to housing 20 and rotatable therewith, a plurality of output clutch plates 24 secured to and rotatable with output gear 14. Housing 20 has a closed end 25 and an open end 26, a sealed ring 27 being disposed within open end 26 to sealingly enclose the internal volume within which plates 22 and 24 are positioned. Clutch 10 preferably has an annular construction and is mounted to surround shaft 12. Housing 20 is secured to shaft 12 via an intermeshing spline 28 in a manner well known in the art. Similarly, clutch plates 22 are secured within housing 20 via intermeshing teeth along their outer periphery, while clutch plates 24 are secured to output gear 14 via similar intermeshing teeth along their inner periphery. Plates from each group 22 and 24 are interleaved alternately with one another and are compressed into engagement upon actuation of clutch 10 as described below.

Clutch 10 further includes an actuator, in the form of a piston 30 movable within housing 20 for compressing plates 22 and 24 for engagement of clutch 10. Piston 30 is mounted within closed end 25 and includes seals 32 around its inner and outer peripheries for sealing piston 30 within an annular groove or barrel 34 of in housing 20. Seals 32 permit piston 30 to slide within groove 34, while sealingly enclosing a pressure chamber 36 between piston 30 and closed end 25 of housing 20. A conduit 38 is formed within shaft 12 and sealingly joined to housing 20, as indicated in broken lines in the FIGURES, for selectively transmitting pressurized fluid into chamber 36 for engagement of clutch 10 and for permitting pressure to be relieved from chamber 36 for disengaging clutch 10.

In the preferred embodiment illustrated, piston 30 includes a pair of lands 40 and 42 extending in the direction of plates 22 and 24. Land 40, which lies outward from land 42, is configured to contact the plate stack upon engagement of clutch 10. Inner land 42 contacts an adjustment and biasing spring pack assembly 44. Adjustment and biasing assembly 44 permits automatic adjustment of clutch 10 to compensate for tolerance variations resulting during manufacture of clutch 10 as well as for wear of clutch plates 22 and 24 during the useful life of clutch 10.

Adjustment and biasing assembly 44 includes a pair of mutually facing abutment members 46 and 48, surrounding and contacting a biasing spring 50. A first of the abutment members 46, shown to the right in the FIGURES, rests in contact with snap ring 51 and thrust washers 52, while the other abutment member 48 is urged by spring 50 into contact with an actuating ring 56. Ring 56, in turn, is urged into contact with an annular inner wall 57 of housing 20. Abutment members 46 and 48 are forced apart from one another by spring 50 a distance 54, corresponding to the running clearance of plates 22 and 24. Assembly 44 also includes an adjustment ring 58 fitted around actuating ring 56. Adjustment ring 58 is interference fitted onto actuating ring 56 and is generally free to slide unidirectionally along ring 56 for adjustment of clutch 10, as described below. In the preferred embodiment illustrated, spring pack assembly 44 is prevented from rotation with piston 30 to prevent damage to assembly 44. It should be noted that, while the foregoing structure is preferred, various alternative structures may be substituted for adjustment ring 58, such as one or a series of snap rings, square rings, large grip rings encircling shaft 12, or a series of small grip rings. Similarly, spring pack assembly 44 could be embody alternative forms, including a series of large bevel springs or a plurality of small bevel spring packs.

Annular inner wall 57 of housing 20 is preferably provided with a fluid passage 60, which may consist of a plurality of apertures in fluid communication with one another or, in the embodiment illustrated, may be formed as an annular groove or recess in wall 57. A fluid conduit 62 within shaft 12 is sealingly coupled to fluid passage 60. Upon installation of clutch 10, fluid conduit 62 is coupled to a source of lubrication or cooling fluid. Actuating ring 56 serves to at least partially cover passage 60 in the disengaged position illustrated in FIG. 1, due to precompression of spring 50. This precompression force is preferably sufficient to reduce or completely interrupt flow of cooling fluid from passage 60.

Figure 2:
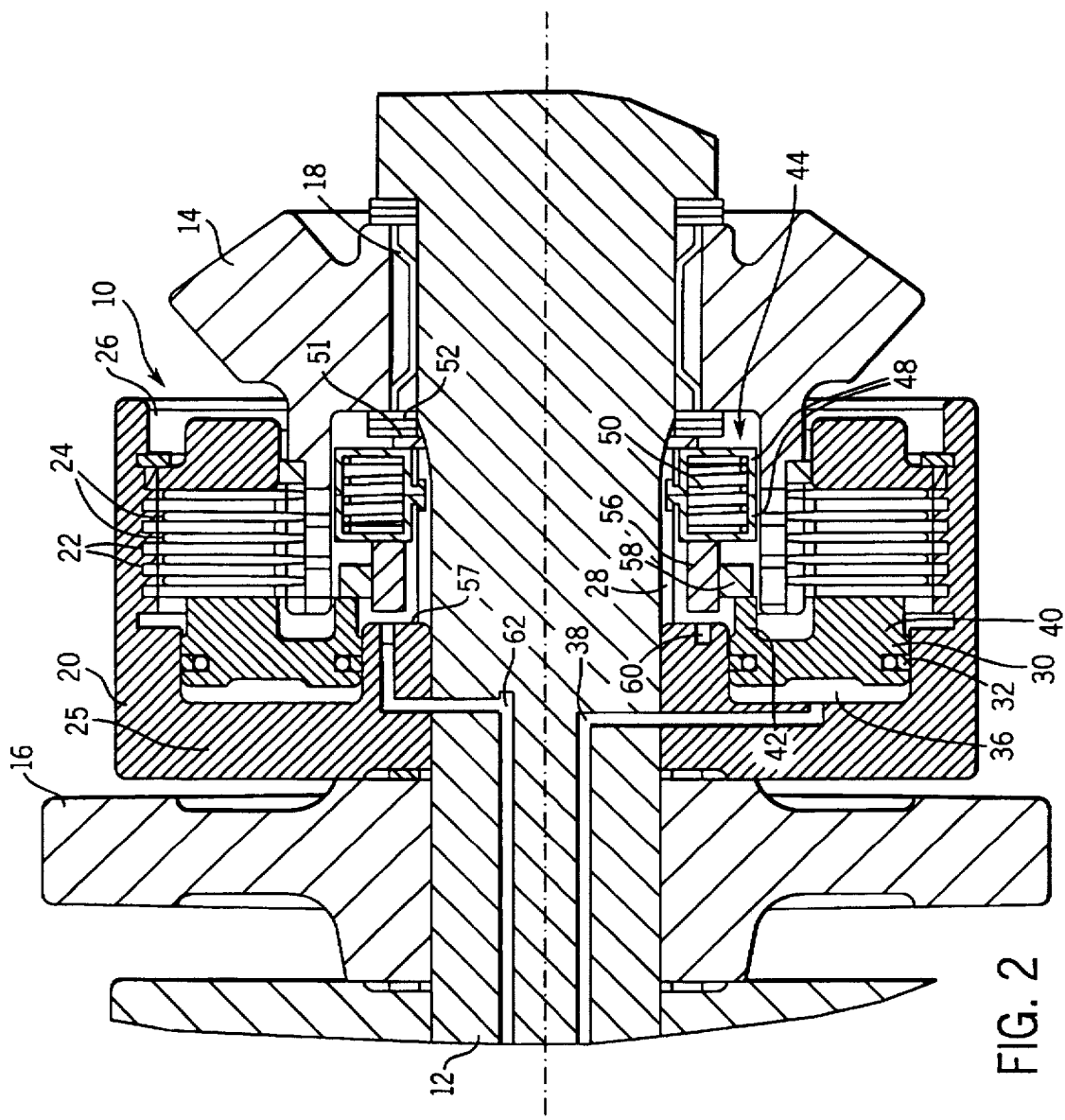
FIG. 2 is a cross sectional view of the clutch of FIG. 1, illustrated in an engaged position.

Clutch 10 is engaged by directing pressurized fluid from a fluid source, such as a vehicle hydraulic system, through conduit 38 and into chamber 36. As shown in FIG. 2, such pressurized fluid causes displacement of piston 30 in the direction of plates 22 and 24, compressing plates 22 and 24 into engagement and transmitting power from input shaft 12 to output gear 14. As outer land 40 contacts the plate stack, inner land 42 contacts adjustment ring 58, forcing ring 58 and actuating ring 56 rearwardly (i.e., to the right in the FIGURES) against the force of spring 50. Actuating ring 56 will continue its movement against the force of spring 50 until abutment members 46 and 48 contact one another. Upon such full engagement of clutch 10 adjustment ring 58 may be displaced along actuating ring 56 to compensate for tolerance variations and wear of clutch plates 22 and 24 as described below. It should also be noted that displacement of actuating ring 56 resulting from movement of piston 30 uncovers fluid passage 60, admitting lubricating or cooling fluid into clutch 10.

Clutch 10 is disengaged by venting pressurized fluid from chamber 36 through conduit 38. Once pressure is relieved from piston 30, spring 50 urges actuating ring 56 rearwardly (i.e., to the left in the FIGURES), thereby urging piston 30 into a disengaged position by contact with adjustment ring 58. Travel of actuating ring 56 continues until ring 56 contacts wall 57 of housing 20, again covering passage 60 and reducing or terminating flow of fluid from conduit 62.

Adjustment and biasing assembly 44 compensates for tolerance variations and wear of clutch plates 22 and 24 as follows. Upon initial assembly of clutch 10, adjustment ring 58 is positioned adjacent to the end of actuating ring 56 in contact with annular wall 57 of housing 20 to ensure that the initial adjustment position obtained provides contact between piston 30 and adjustment ring 58. Following assembly, clutch 10 is initially engaged by pressurizing chamber 36, forcing piston 30 into engagement with clutch plates 22 and 24. As outer land 40 compresses plates 22 and 24, inner land 42 displaces adjustment ring 58 and actuating ring 56 against the force of biasing spring 50. Displacement of actuating ring 56 is stopped by abutment of members 46 and 48, while adjustment ring 58 may be further displaced along actuating ring 56 as piston 30 fully engages clutch 10. Subsequently, upon venting of pressure from chamber 36, piston 30 is forced back into its disengaged position, which is now defined by the location of adjustment ring 58. Piston 30 preferably remains in contact with adjustment ring 58 due to seal drag between piston 30 and housing 20. Adjustment ring 58 thus serves as a reference member, returning piston 30 to a reference disengaged position despite manufacturing tolerance variations in clutch 10.

Figure 3:
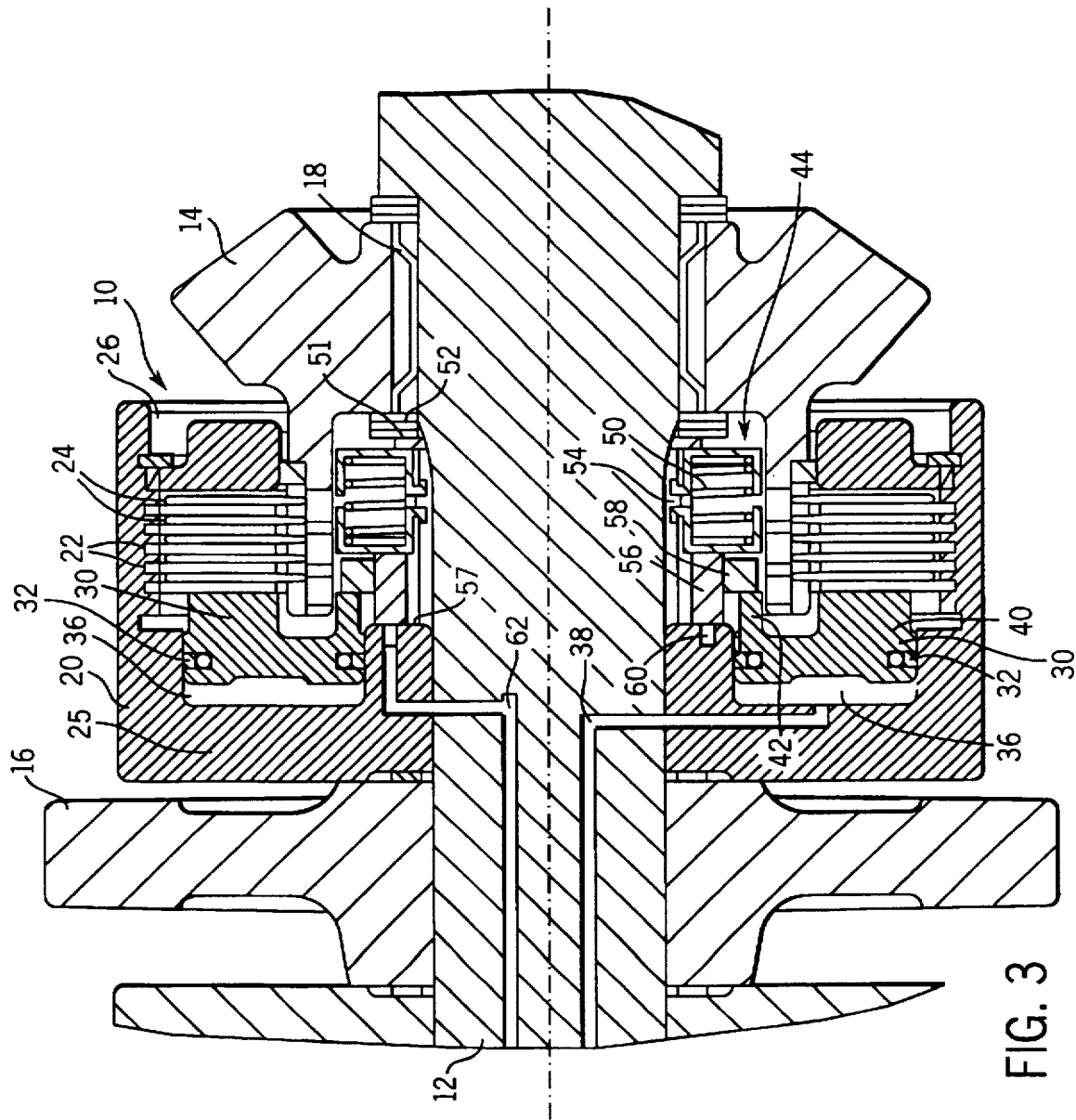
FIG. 3 is a cross sectional view of the clutch of FIG. 1 after a period of wear, showing the position of the piston and reference member in a disengaged position.
Figure 4:
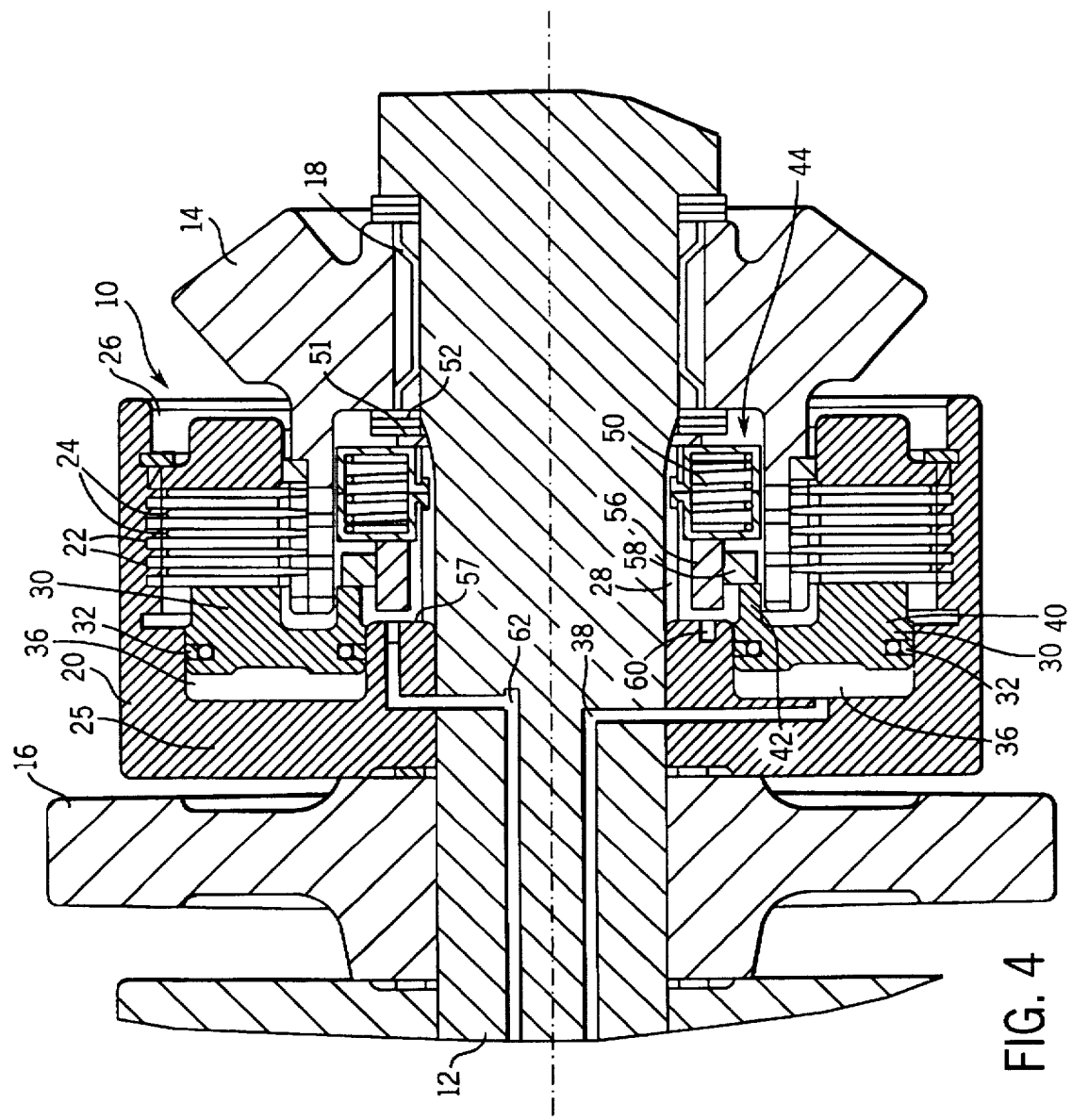
FIG. 4 is a cross sectional view of the worn clutch of FIG. 3 shown in the engaged position.

As clutch plates 22 and 24 wear, adjustment and biasing assembly 44 continues to adjust clutch 10 to compensate for such wear. As illustrated in FIGS. 3 and 4, wear of clutch plates 22 and 24 requires that piston 30 be returned to a disengaged position that is spaced somewhat from closed end 25 of housing 20 to provide consistent performance of clutch 10. This is accomplished by allowing adjustment ring 58 to be further displaced along actuating ring 56 as plates 22 and 24 wear. As best illustrated in FIG. 4, each time clutch 10 is engaged, piston 30 moves into complete engagement against plates 22 and 24, displacing adjustment ring 58 to compensate for wear of plates 22 and 24. When clutch 10 is subsequently disengaged, piston 30 is returned to its wear compensated reference position by contact with adjustment ring 58.

It should be noted that adjustment ring 58 is engaged around actuating ring 56 with sufficient interference fit to ensure compression of biasing spring 50 upon engagement of clutch 10. However, the force required to displace ring 58 on ring 56 is substantially less than the engagement force exerted by piston 30 during engagement of clutch 10. This relationship ensures that adjustment ring 58 will not be displaced along actuating ring 56 until clutch 10 is fully engaged, thereby limiting movement of adjustment ring 58 to displacement required for tolerance and wear compensation only. It has been found that the foregoing structure provides clutch 10 with highly consistent performance and shift quality by maintaining a predictable fill time over its useful life. Moreover, while the structure may be used in conjuction with electronic control systems, it provides a cost effective means of adjusting for wear without the need for electronic recalibration.

It should also be noted that the preferred structure of fluid passage 60 and actuating ring 56 described above conveniently provides a valving mechanism for admitting and reducing or terminating flow of a cooling or lubricating fluid into clutch 10. This valving mechanism permits such fluid flow during actuation of clutch 10 to remove or diminish heat generated by clutch plates 22 and 24, but allows this fluid flow to be interrupted when clutch 10 is not engaged. It has been found that the ability to interrupt flow in this manner to clutches which are disengaged permits system designs employing smaller volume pumping units, particularly where a number of clutches are used and supplied with cooling fluid in a single transmission system, such as a powershift transmission. It has been found that by thus interrupting flow of fluid to clutches not currently engaged, degradation and aeration of hydraulic fluid is reduced, improving the useful life of system components. Moreover, by interrupting flow of fluid through the clutch, drag within the clutch is reduced, thereby reducing heating and related inefficiencies.

While the embodiments illustrated in the FIGURES and described above are presently preferred, it should be understood that these embodiments are offered by way of example only and may be adapted to various other structures. For example, the adjustment arrangement described above may be adapted to incorporation in clutches other than fluid actuated clutches of the type described above, such as electric clutches. Moreover, the preferred configuration of adjustment ring 58 on actuating ring 56 is susceptible to various alternative designs, particularly with respect to the geometry and layout of these members. In addition, adjustment ring 58 may be formed as an annular band, as illustrated in the FIGURES and described above, or may be a washer-type element fitted to actuating ring 56 and movable along ring 56 to establish the reference or disengaged position of piston 30. Furthermore, the particular arrangement of conduits 38 and 62, and of fluid passage 60 illustrated in the FIGURES and discussed above are intended to be exemplary only, and may be adapted in a variety of manners to provide a positive seal between shaft 12 and clutch 10, or between actuating ring 56 and fluid passage 60. By way of a further modification, a biasing assembly and/or adjustment member could be positioned behind the piston, or disposed about the perimeter of the piston clutch plates. Furthermore, without limiting the range of configurations which would provide a suitable adjustment member, instead of a ring 58, the adjustment member could include a plurality of pawls. The pawls would be arranged to limit movement relative to the biasing assembly to a single direction (i.e., the direction of engagement). A pawl or similar one-way ratcheting arrangement would eliminate the need to rely on friction alone to limit movement of the adjustment member. The invention is not intended to be limited to any particular embodiment, and, in addition to the modifications and variations discussed above, the invention, is intended to extend to various modifications that nevertheless fall within the scope of the appended claims.

We claim:

1. A self-adjusting fluid clutch for selectively coupling two power transmission elements, the clutch comprising:

a housing including a pressure chamber;

a plurality of clutch plates including first plates located within the housing and coupled to rotate with a first transmission element and second plates coupled to rotate with a second transmission element;

a piston located within and sealed against the housing by a seal, the pressure chamber located on a first side of the seal and the clutch plates located on a second side of the seal, whereupon sufficient fluid flow into the pressure chamber moves the piston in an engagement direction from disengaged to engaged positions to selectively apply an engagement force to the clutch plates to engage the clutch;

a biasing assembly disposed to urge the piston toward the disengaged position, the biasing assembly including a biasing member and an adjustment member, the biasing member urging the piston and the adjustment member into contact with one another, the adjustment member being located on the second side of the seal opposite the pressure chamber and contacting the piston to establish the disengaged position thereof, the adjustment member being unidirectionally movable relative to the biasing member in the engagement direction in response to movement of the piston to the engaged position.

2. The clutch of claim 1, wherein the piston is disposed within an annular cylindrical portion of a clutch housing and includes seals extending between the piston and the cylindrical portion permitting sealed motion of the piston within the housing.

3. The clutch of claim 1, wherein the biasing assembly includes abutment surfaces engaging one another upon engagement of the clutch and spaced from one another upon disengagement of the clutch to define a running clearance of the clutch plates.

4. The clutch of claim 1, wherein the biasing assembly includes an actuating sleeve, the adjustment member being fitted to the actuating sleeve and movable unidirectionally on the actuating sleeve to establish the disengaged position of the piston.

5. The clutch of claim 4, wherein at least a portion of the biasing assembly is prevented from rotation with the first transmission element.

6. The clutch of claim 4, wherein the adjustment member is friction fitted around the actuating sleeve.

7. The clutch of claim 1, further comprising a fluid valve for selectively permitting fluid flow into the clutch plates.

8. The clutch of claim 7, wherein the fluid valve is selectively opened and closed by movement of the piston.

9. The clutch of claim 7, wherein the fluid valve includes a valve aperture and the biasing assembly includes an actuating sleeve, the actuating sleeve at least partially covering the valve aperture when the piston is in the disengaged position and the actuating sleeve uncovering the valve aperture when the piston is in the engaged position.

10. A self-adjusting clutch for selectively coupling a rotating driving member to a rotatable driven member, comprising:

a housing;

a plurality of clutch plates located within the housing, the clutch plates including first clutch plates secured to rotate with the driving member and second clutch plates secured to rotate with the driven member upon engagement with the first clutch plates;

an actuator movable within the housing for selectively urging the first and second clutch plates into mutual engagement; and a self adjustment assembly contacting the actuator and defining a disengaged position of the actuator, the adjustment assembly including an abutment member, a reference member and a biasing assembly, the abutment member being moved by the actuator against the biasing assembly and contacting a portion of the biasing assembly to define an engaged position of the clutch, the reference member being unidirectionally movable during engagement of the clutch to establish the disengaged position of the actuator.

11. The clutch of claim 10, wherein the reference member is fitted around the abutment member and unidirectionally slidable along the abutment member during engagement of the clutch to establish disengaged position of the actuator.

12. The clutch of claim 10, wherein the actuator is a fluid piston having a periphery establishing a seal with an internal surface of the housing.

13. The clutch of claim 10, wherein movement of the actuator to the engaged position opens a fluid passage for admitting fluid into the housing.

14. The clutch of claim 13, wherein the abutment member at least partially covers the fluid passage when the clutch is disengaged and moves in response to movement of the actuator during engagement of the clutch to uncover the passage.

15. The clutch of claim 10, wherein the biasing assembly includes a spring and a pair of abutment elements, the spring urging the abutment elements to a spaced apart position to define a running clearance of the clutch plates.

16. A method for compensating for tolerance or wear in a fluid clutch of the type including a housing, a plurality of clutch plates within the housing and a piston sealingly movable within the housing for selectively urging the clutch plates into engagement and thereby coupling a driving member to a driven member, the method comprising the steps of:

(a) moving an engagement member through a predetermined distance in a first direction against a biasing assembly during engagement of the clutch, wherein movement of the engagement member in the first direction opens a fluid passage and admits a fluid into the clutch;

(b) moving a reference member through the predetermined distance in the first direction during movement of the engagement member;

(c) moving the reference member through a compensation distance in the first direction;

(d) moving the engagement member and the reference member through the predetermined distance in a second direction opposite to the first direction under the influence of the biasing assembly during disengagement of the clutch, the reference member contacting the piston to urge the piston to a reference disengaged position.

17. The method of claim 16, wherein the reference member is fitted to the engagement member for unidirectional movement in the second direction along the engagement member.

18. The method of claim 16, wherein the biasing assembly defines a running clearance of the clutch plates.

19. The method of claim 16, wherein the piston is urged into contact with the reference member in the disengaged position by fluid pressure.

20. A method for actuating a clutch of the type including a housing, a plurality of clutch plates mutually engageable to couple a driving member to a driven member, and an actuator selectively movable between an engagement position and a disengagement position to engage the clutch plates, the method comprising the steps of:

(a) moving a reference member upon movement of the actuator to the engaged position to establish a reference position for the actuator, wherein the reference position varies due to clutch wear and tolerances;

(b) opening a fluid passage by movement of the actuator to the engaged position, thereby admitting a fluid flow into contact with the clutch plates;

(c) urging the actuator to a disengaged position defined by the reference position upon disengagement of the clutch; and (d) reducing the fluid flow through the fluid passage by movement of the actuator to the disengaged position.

21. The method of claim 20, wherein the reference member is fitted to an engagement member and unidirectionally movable with respect to the engagement member to establish the reference position.

22. The method of claim 21, wherein the engagement member at least partially covers the fluid passage when the actuator is in the disengaged position and is moved by the actuator in step (b) to admit the fluid flow through the passage.

23. The method of claim 20, wherein the actuator is a fluid piston sealingly movable within the clutch housing.

24. A self-adjusting fluid clutch for selectively coupling two power transmission elements, the clutch comprising:

a housing including a fluid passage communicating with an interior of the housing for admitting a fluid into the housing;

a plurality of clutch plates located within the housing, the clutch plates including first clutch plate secured to rotate with a first transmission element and second plates coupled to rotate with a second transmission element;

a piston moveable in an engagement direction from disengaged to engaged positions to selectively apply an engagement force to the clutch plates to engage the clutch;

a biasing member disposed to urge the piston toward the disengaged position; and an adjustment member contacting the piston to establish the disengaged position thereof, the adjustment member being moveable relative to the biasing member in the engagement direction in response to movement of the piston to the engaged position, wherein the adjustment member reduces fluid flow through the fluid passage when the piston is in the disengaged position.

* * * * *